United States Patent [19]

Shagoury

[11] Patent Number: 5,544,700

[45] Date of Patent: Aug. 13, 1996

[54] METHOD AND APPARATUS FOR PREFERENTIAL COOLING

[75] Inventor: John G. Shagoury, Reading, Mass.

[73] Assignee: General Electric Company, Cincinnati, Ohio

[21] Appl. No.: 293,619

[22] Filed: Aug. 22, 1994

[51] Int. Cl.$^6$ ............................................. F02C 7/06
[52] U.S. Cl. ............................................. 165/139; 165/161
[58] Field of Search ............................. 165/34, 139, 161

[56] References Cited

U.S. PATENT DOCUMENTS

| | | | |
|---|---|---|---|
| 1,517,673 | 12/1924 | Eberle | 165/139 X |
| 1,815,932 | 7/1931 | Sieder | 165/139 X |
| 2,392,638 | 1/1946 | Bowman et al. | 165/161 X |
| 3,871,445 | 3/1975 | Wanka et al. | 165/161 X |
| 3,958,630 | 5/1976 | Smith | 165/161 |
| 4,020,632 | 5/1977 | Coffinberry et al. | 60/39.03 |
| 4,151,710 | 5/1979 | Griffin et al. | 60/39.08 |
| 4,348,991 | 9/1982 | Stang et al. | 123/41.29 |
| 4,354,345 | 10/1982 | Dreisbach, Jr. et al. | 60/39.08 |
| 4,503,679 | 3/1985 | Saito et al. | 60/605 |
| 4,696,156 | 9/1987 | Burr et al. | 60/39.08 |
| 5,105,875 | 4/1992 | McArthur | 165/1 |

FOREIGN PATENT DOCUMENTS

| | | | |
|---|---|---|---|
| 167902 | 2/1906 | Germany | 165/161 |

*Primary Examiner*—John C. Fox
*Attorney, Agent, or Firm*—Andrew C. Hess; Wayne O. Traynham

[57] ABSTRACT

A heat exchanger includes first and second circuits disposed in a counterflow configuration for respectively channeling first and second fluids. In one embodiment, the first circuit is joined to an aircraft engine fuel tank with the first fluid or fuel being a heat sink, and the second circuit is joined to a plurality of aircraft engine oil sumps, with the second fluid or oil being cooled in the heat exchanger by the fuel. The second circuit of the heat exchanger includes first and second outlets in succession with a portion of the oil being removed prior to completion of flow through the heat exchanger and channeled to one or more of the sumps. The remaining portion of the oil in the heat exchanger is removed after completion of flow therethrough at a lower temperature than that of the first portion and is channeled to a predetermined one of the sumps for providing cooler oil thereto.

7 Claims, 2 Drawing Sheets

METHOD AND APPARATUS FOR PREFERENTIAL COOLING

BACKGROUND OF THE INVENTION

The present invention relates generally to gas turbine engines, and, more specifically, to an oil cooling system therein.

A typical gas turbine engine used for powering an aircraft in flight includes a fan having one or more stages followed in turn by a multi-stage high pressure compressor which provides compressed air to a combustor wherein it is mixed with fuel and ignited for generating combustion gases which flow downstream to a high pressure turbine (HPT) and in turn to a low pressure or power turbine (LPT), which turbines power the high pressure compressor and fan, respectively. A rotor shaft joins the fan to the LPT and is suitably mounted in bearings, and another rotor shaft joins the compressor to the HPT with additional bearings being used.

In one exemplary turbine engine, five main bearings are axially spaced apart along the engine from the fan to the LPT, and three axially spaced apart oil sumps are provided for channeling lubricating oil to the several bearings as well as to a conventional accessory gearbox. In this example, the number one bearing associated with the fan is lubricated from a forward sump, the number two and three bearings and the accessory gear box are lubricated from the intermediate sump, and the number 4 and five bearings are lubricated from an aft sump.

The several sumps are typically connected to a common oil tank which in turn is connected to an oil filter and then to a counterflow, two circuit heat exchanger or oil cooler. A conventional multi-element pump pumps the oil from the several sumps to the oil tank and through the oil filter to the heat exchanger. The primary, or cooling circuit of the heat exchanger is conventionally joined to a fuel tank in the aircraft which provides a heat sink in the relatively cool fuel which is used in the heat exchanger for cooling the relatively hot oil channeled thereto from the sumps. The oil cooled in the heat exchanger is typically returned to all three sumps for providing filtered and cooled oil at one temperature as provided by the single oil outlet of the heat exchanger.

In one turbine engine being developed, the number 4 bearing is a relatively highly loaded differential bearing mounted between the two rotors of the HPT and the LPT whose life is sensitive to the temperature of the cooling oil provided thereto. It is desirable to provide cooled oil to the number 4 differential bearing at a lower temperature than that oil supplied to the other bearings for improving the useful life thereof.

SUMMARY OF THE INVENTION

A heat exchanger includes first and second circuits disposed in a counterflow configuration for respectively channeling first and second fluids. In one embodiment, the first circuit is joined to an aircraft engine fuel tank with the first fluid or fuel being a heat sink, and the second circuit is joined to a plurality of aircraft engine oil sumps, with the second fluid or oil being cooled in the heat exchanger by the fuel. The second circuit of the heat exchanger includes first and second outlets in succession with a portion of the oil being removed prior to completion of flow through the heat exchanger and channeled to one or more of the sumps. The remaining portion of the oil in the heat exchanger is removed after completion of flow therethrough at a lower temperature than that of the first portion and is channeled to a predetermined one of the sumps for providing cooler oil thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
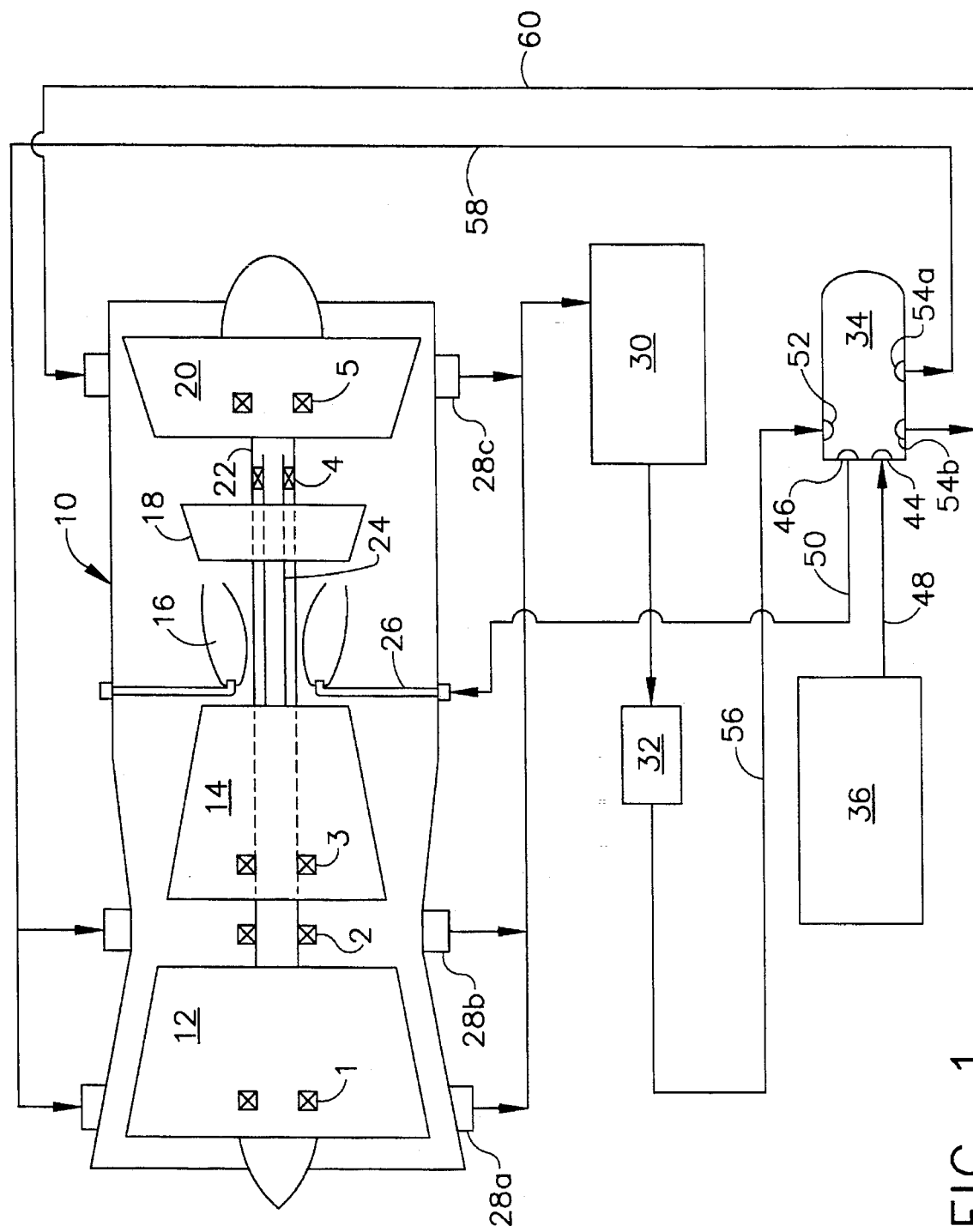
FIG. 1 is a schematic representation of an aircraft gas turbine engine including a lubrication system having a heat exchanger in accordance with one embodiment of the present invention.

Illustrated schematically in FIG. 1 is an exemplary turbofan aircraft gas turbine engine 10 which conventionally includes in serial flow about a longitudinal centerline axis a fan 12 having one or more stages, a multi-stage, axial flow, high pressure compressor 14, an annular combustor 16, a high pressure turbine (HPT) 18 having one or more stages, and a multi-stage low pressure or power turbine (LPT) 20. A first (LP) rotor shaft 22 joins the fan 12 to the LPT 20, and a second (HP) rotor shaft 24 is disposed coaxially within the first shaft 22 and joins the compressor 14 to the HPT 18.

During operation, ambient air enters the fan 12 and flows in turn through the compressor 14 wherein it is pressurized and channeled to the combustor 16 wherein it is mixed with fuel from a plurality of conventional fuel injectors 26 and conventionally ignited for generating combustion gases which flow downstream in turn through the HPT 18 and the LPT 20 which respectively rotate the compressor 14 and the fan 12.

The rotor components of the engine 10 are conventionally mounted in several axially spaced apart bearings including bearings number 1 through 5 for example. Bearing No. 1 is located at the forward end of the engine supporting the fan 12, bearing Nos. 2 and 3 are located at an intermediate portion of the engine at the forward end of the compressor 14, and bearing Nos. 4 and 5 are located at the aft end of the engine at the LPT 20. In this exemplary embodiment, bearing No. 4 is a conventional differential bearing mounted between the first and second rotor shafts 22, 24.

The exemplary engine 10 includes a lubrication system having a plurality of conventional oil sumps including for example a forward oil sump 28a disposed adjacent to the fan 12 for providing cooling oil to bearing No. 1 thereat; an intermediate oil sump 28b disposed at an intermediate portion of the engine 10 adjacent to the forward end of the compressor 14 for providing cooling oil to bearing Nos. 2 and 3, and to a conventional accessory gearbox (not shown); and an aft oil sump 28c disposed adjacent to the LPT 20 for providing oil to both bearing Nos. 4 and 5 thereat.

All of the oil sumps 28a–c are conventionally joined through suitable conduits to a common oil tank 30 which in turn is conventionally connected with a conduit to an oil filter 32, which in turn is suitably connected to a heat exchanger 34 in accordance with one embodiment of the present invention. The heat exchanger 34 includes two hot and cold counterflow cooling circuits therein, one of which is conventionally joined to an aircraft engine fuel tank 36, with the fuel therein providing a heat sink for cooling the oil in the lubrication system including the several sumps 28a–c. The fuel tank 36 is also conventionally joined to the fuel injectors 26 for providing fuel to the combustor 16.

A conventional multi-element pump (not shown) suitably channels the oil from the several sumps 28a–c in turn to the oil tank 30, the oil filter 32, the heat exchanger 34, and back to the sumps 28a–c. But for the heat exchanger 34 and its incorporation into the lubrication system illustrated in FIG. 1, the engine 10 and the lubrication system are conventional. In a conventional system, a typical heat exchanger would have two circuits with one joined to the fuel tank 36 for providing the cooling fuel, and the other circuit channeling the relatively hot oil from the oil filter 32 for cooling in the heat exchanger which would have a single oil outlet returning the cooled oil to all three sumps 28a–c for providing cooling oil to the several bearings 1–5 at a single, common temperature. However, in the development engine addressed above in the Background section, it is noted that the No. 4 bearing is a highly loaded, differential bearing whose life is sensitive to oil temperature. By reducing the temperature of the oil supplied to the No. 4 bearing, its life can be substantially improved.

Accordingly, in accordance with the present invention, the heat exchanger 34 is configured for providing cooling oil to the aft sump 28c and in turn to the No. 4 bearing, as well as the No. 5 bearing, at a reduced temperature compared to the cooled oil provided to the forward and intermediate sumps 28a,b and bearing Nos. 1–3 cooled therefrom.

Figure 2:
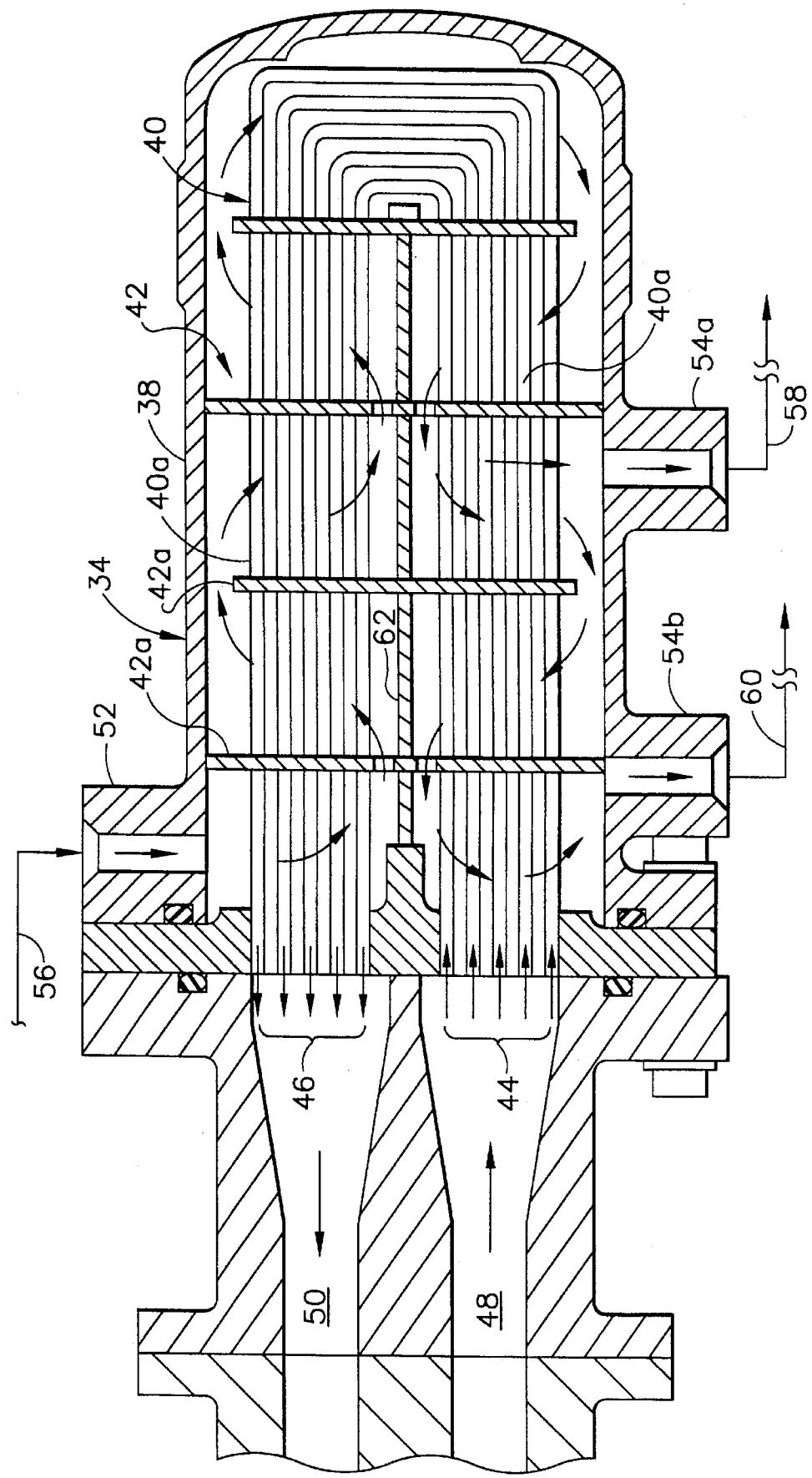
FIG. 2 is a schematic, partly sectional view of the heat exchanger illustrated in FIG. 1.

More specifically, the heat exchanger 34 is illustrated in more particularity in FIG. 2 and is configured in an exemplary embodiment for exchanging heat between a first fluid such as the relatively cold fuel from the fuel tank 36 and a second fluid such as the relatively hot oil from the several sumps 28a–c. Although the heat exchanger 34 may take any conventional configuration suitably modified in accordance with the present invention, in the embodiment illustrated in FIG. 2 it is of the tube-and-shell design including a housing or shell 38 in which are disposed first and second fluid channeling circuits 40 and 42, respectively.

The first circuit 40 includes a plurality of parallel flow tubes 40a aligned together at one end thereof to collectively define a primary inlet 44, and aligned together at an opposite end thereof to collectively define a primary outlet 46. The shell 38 includes a mounting flange for conventionally mounting the heat exchanger 34 to a suitable mating flange (of a flow meter for example) having supply and return conduits 48 and 50 for channeling cold fuel from the fuel tank 36 to the primary inlet 44 and returning heated fuel from the primary outlet 46 to the fuel injectors 26 of the engine 10.

The second circuit 42 is disposed in the shell 38 adjacent to the first circuit 40 for channeling the hot oil from the sumps 28a–c in counterflow with the first circuit 40 for exchanging heat therebetween. The second circuit 42 includes a secondary inlet 52 at one end thereof, and first and second secondary outlets 54a, 54b at an intermediate location and at an opposite end thereof, respectively. The secondary inlet 52 is suitably joined to the oil sumps 28a–c by an oil supply conduit 56 disposed in series flow with the oil filter 32, oil tank 30, and the sumps 28a–c. The first and second secondary outlets 54a,b are independently joined to first and second oil return conduits 58 and 60 for separately returning oil at differently cooled temperatures to respective ones of the oil sumps 28a–c.

As illustrated in FIG. 2, the first secondary outlet 54a is disposed at an intermediate location in series flow with the secondary inlet 52, and the second secondary outlet 54b is disposed at the opposite end of the second circuit 42 in series or succession with the first secondary outlet 54a, with the first and second secondary outlets 54a,b being effective for discharging the oil therefrom at different temperatures. The secondary inlet 52 is preferably disposed through the shell 38 adjacent to the primary outlet 46 since the secondary inlet 52 receives the hottest oil from the oil tank 30, and the primary outlet 46 returns the heated fuel to the fuel tank 36. The second secondary outlet 54b is preferably disposed through the shell 38 adjacent to the primary inlet 44 since the second secondary outlet 54b will provide the coldest return oil from the heat exchanger 34, with the primary inlet 44 providing the coldest fuel to the heat exchanger 34 from the fuel tank 36. The first secondary outlet 54a is disposed through the shell 38 between the primary outlet 46 and both the primary inlet 44 and the second secondary outlet 54b. The position of the first secondary outlet 54a relative to the second secondary outlet 54b is a primary factor in determining the temperatures of the oil discharged therefrom since extracting the oil from the first secondary outlet 54a prevents its passage through the complete second circuit 40, whereas the oil extracted from the second secondary outlet 54b undergoes complete cooling through the entire second circuit 42 within the heat exchanger 34.

But for the introduction of the additional, intermediately located first secondary outlet 54a and its cooperation in the engine lubrication system, the heat exchanger 34 is otherwise conventional. Hot oil is channeled through the secondary inlet 52 and passes in crossflow over the first circuit 40 which extracts heat therefrom. Without the intermediate secondary outlet 54a all of the oil channeled to the heat exchanger 34 would complete the full cooling cycle and be discharged from the second secondary outlet 54b at one temperature.

In accordance with the improved method of the present invention, a first portion of the oil flowing in the second circuit 42 is removed therefrom by the first secondary outlet 54a prior to completion of the full extent of the second circuit 42 which will necessarily reduce its temperature drop relative to its temperature if it were allowed to complete the entire cooling passage and be discharged from the second secondary outlet 54b. The remaining or second portion of the oil channeled in the second circuit 42 is removed from the second secondary outlet 54b after completion of the entire passage through the second circuit 42 which provides additional cooling thereof not provided in the oil first portion removed from the first secondary outlet 54a.

By removing the oil first portion prematurely from the heat exchanger 34 through the first secondary outlet 54a, it undergoes limited or partial heat transfer therein which reduces its temperature reduction. However, by allowing the remaining second portion of the oil in the second circuit 42 to complete the full heat transfer cycle therein, it not only maximizes the temperature reduction in the cooling oil but further increases the reduction in temperature compared to a conventional single oil outlet heat exchanger of comparable capacity since the cooling effect of the relatively cold fuel entering the first circuit 40 at its inlet 44 necessarily interacts with less of the total volume of hot oil being cooled since the first portion is being removed from the first secondary outlet 54a.

In one exemplary configuration analyzed which compared otherwise identical two-circuit heat exchangers: one with the two secondary outlets 54a,b illustrated in FIG. 2; and one with a single secondary outlet represented by the second secondary outlet 54b, the oil first portion removed from the first secondary outlet 54a was cooled to a temperature which was about 17° C. greater than the reference cooled temperature if all of the oil were removed from solely the second secondary outlet 54b. And, most significantly, the temperature of the remaining second portion of oil removed from the second secondary outlet 54b had an additional temperature reduction of about 5° C. relative to the reference temperature of the oil if all of the oil were removed solely from the second secondary outlet 54b. By sacrificing a portion of the possible temperature reduction in the oil first portion removed from the first secondary outlet 54a, the cooling affect of the fuel channeled through the first circuit 40 may be preferentially used for additionally cooling the remaining second portion of oil removed from the second secondary outlet 54b. In this way, for given operating conditions, oil extracted from the second secondary outlet 54b may have a significant reduction in temperature both compared to the temperature of the oil extracted from the first secondary outlet 54a as well as from the reference temperature of the cooled oil if it were all extracted solely from the second secondary outlet 54b.

Since the second circuit 42 has a single inlet 52 and two outlets 54a,b in succession, the total flowrate of oil supplied to the second circuit 42 at the secondary inlet 54 is equal to the total of the separate flowrates of the oil removed from the first and second secondary outlets 54a,b. In the exemplary embodiment illustrated in FIG. 2, the oil first portion removed from the first secondary outlet 54a is removed at a greater flowrate than the remaining second portion of the oil removed from the second secondary outlet 54b. For example, 75% of the total oil flowrate may be removed from the first secondary outlet 54a with the remaining 25% of the total oil flowrate being removed from the second secondary outlet 54b. Of course, the relative position of the first secondary outlet 54a between the secondary inlet 52 and the second secondary outlet 54b may be adjusted as desired in combination with the respective flowrates through the fist and second secondary outlets 54a,b to suitably control the additional cooling effect on the oil discharged from the second secondary outlet 54b, and the reduced cooling effect on the oil discharged from the first secondary outlet 54a.

Returning again to FIG. 2, the second circuit 42 in this exemplary embodiment preferably includes a plurality of baffles 42a spaced apart from each other inside the shell 38 to define a serpentine crossflow channel over the flow tubes 40a for exchanging heat between the first and second fluids, or fuel and oil, flowable therethrough. The shell 38 preferably includes a conventional flow divider or septum 62 which separates the shell 38 into two compartments, top and bottom as illustrated in FIG. 2. The flow tubes 40a are generally U-shaped in configuration with parallel legs thereof straddling the shell divider 62 in a conventional fashion. This positions the primary inlet 44 and the primary outlet 46 on opposite top and bottom sides of the divider 62. The baffles 42a extend outwardly from the dividers 62 into both top and bottom compartments for channeling the oil from the secondary inlet 52 across the tubes 40a in serpentine fashion through the two compartments in turn for discharging the oil first portion from the first secondary outlet 54a in the bottom compartment, and discharging the oil second portion from the second secondary outlet 54b also in the bottom compartment. As shown in FIG. 2, alternating ones of the baffles 42a either end short of the inside surface of the shell 38 to provide a crossover passage, or include orifices adjacent to the divider 62 for providing crossover passages as is conventionally known.

Referring again to FIG. 1, the first secondary outlet 54a is preferably disposed in flow communication with the forward oil sump 28a as well as the intermediate oil sump 28b for channeling thereto oil cooled in the heat exchanger 34 at the higher reduced temperature from the first secondary outlet 54a. The second secondary outlet 54b is preferably disposed in flow communication with solely the aft oil sump 28c for channeling thereto the oil second portion having maximum cooling reduction with its temperature being lower than the temperature of the oil discharged from the first secondary outlet 54a. In this way, the coolest oil discharged from the heat exchanger 34 is provided to the aft sump 28c and in turn is provided to the No. 4 bearing which requires additional cooling for improving its useful life. Since the No. 5 bearing also receives oil from the aft sump 28c it too enjoys cooler oil.

The preferential heat exchanger 34 described above may use the same basic structure as existing two-circuit heat exchangers except for adding an additional oil discharge port independently joined to the aft sump 28c. In this way, a portion of the hot oil supplied to the heat exchanger 34 undergoes the full cooling cycle of the heat exchanger 34 for providing the coolest oil to the aft sump 28c and in turn to the No. 4 bearing, at the expense of providing less-cooled oil to the forward and intermediate sumps 28a,b. The heat exchanger 34 therefore prioritizes the oil distribution to send the coolest oil where it is needed the most, i.e. the No. 4 bearing, with the remaining less-cooled oil being distributed to other parts of the engine. The heat exchanger 34 also allows cooler oil to be obtained from the second secondary outlet 54b than could otherwise be obtained using given or existing heat load in the hot oil provided to the heat exchanger 34 and the given heat sink in the cool fuel provided from the fuel tank 36 as compared to conventional single oil outlet heat exchanger designs. These benefits are provided at relatively low cost since an additional, separate heat exchanger and associated plumbing would otherwise be required for providing cooled oil at different temperatures to the various sumps in the engine 10. No additional complex valves are required for the heat exchanger 34 since the existing conventional oil nozzle orifices in the several sumps 28a–c control the distribution of oil flow as required to the various bearings and components.

In alternate embodiments of the invention, different types of heat exchangers could be utilized and modified in accordance with the present invention to provide an additional outlet in the second circuit 42. Fluids other than oil or fuel could also be used in the heat exchanger as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A heat exchanger for exchanging heat between a first fluid and a different temperature second fluid in a gas turbine engine comprising:

a shell including a flow divider separating said shell into two compartments;

a first circuit disposed in said shell for channeling said first fluid, and having a plurality of parallel flow tubes aligned together at one end thereof to collectively define a primary inlet and aligned together at an opposite end thereof to collectively define a primary outlet;

said flow tubes being generally U-shaped in configuration with parallel legs thereof straddling said shell divider for positioning said primary inlet and said primary outlet on opposite sides of said divider;

a second circuit disposed in said shell adjacent to said first circuit for channeling said second fluid in counterflow with said first circuit for exchanging heat therebetween, and having a secondary inlet at one end disposed through said shell adjacent to said primary outlet, a first secondary outlet at an intermediate location in series flow with said secondary inlet, and a second secondary outlet at an opposite end in succession with said first secondary outlet and being disposed through said shell adjacent to said primary inlet, said first secondary outlet being disposed through said shell between said primary outlet and both said primary inlet and said second secondary outlet for discharging said second fluid therefrom at different temperatures; and said second circuit further including a plurality of baffles spaced apart from each other inside said shell to define a serpentine crossflow channel over said flow tubes for exchanging heat between said first and second fluids flowable therethrough, said baffles extending outwardly from said divider into both said compartments for channeling said second fluid from said secondary inlet across said tubes and through said two compartments in turn for discharging a first portion of said second fluid from said first secondary outlet, and for discharging a remaining, second portion thereof from said second secondary outlet.

2. A heat exchanger according to claim 1 in combination with an aircraft gas turbine engine and further comprising:

a plurality of oil sumps in said engine;

an oil tank disposed in flow communication with said plurality of oil sumps for receiving oil therefrom;

a fuel tank for supplying fuel to said engine; and said heat exchanger being disposed in flow communication with said oil tank and said fuel tank; and wherein said primary inlet and said primary outlet are disposed for channeling fuel from said fuel tank and to said engine;

said secondary inlet is disposed for receiving oil from said oil tank; and said first and second secondary outlets are independently disposed for returning oil to respective ones of said plurality of oil sumps.

3. A combination according to claim 2 wherein:

a forward one of said oil sumps is disposed adjacent to a fan of said engine for providing cooling oil to a bearing thereat;

an aft one of said oil sumps is disposed adjacent to a turbine of said engine for providing oil to a bearing thereat;

said first secondary outlet of said heat exchanger is disposed in flow communication with said forward oil sump for channeling thereto oil cooled in said heat exchanger; and said second secondary outlet of said heat exchanger is disposed in flow communication with said aft oil sump for channeling thereto oil cooled in said heat exchanger to a lower temperature than the temperature of said oil discharged from said first secondary outlet.

4. A combination according to claim 2 wherein said bearing provided with oil from said aft sump is a differential bearing disposed between respective rotor shafts of a pair of turbines of said engine.

5. A combination according to claim 4 wherein:

said first circuit further includes a plurality of parallel flow tubes aligned together at one end thereof to collectively define said primary inlet, and aligned together at an opposite end thereof to collectively define said primary outlet; and said second circuit further includes a plurality of baffles spaced apart from each other inside said shell to define a serpentine crossflow channel over said flow tubes for exchanging heat between said first and second fluids flowable therethrough.

6. A combination according to claim 5 wherein:

said shell includes a flow divider separating said shell into two compartments;

said flow tubes are generally U-shaped in configuration with parallel legs thereof straddling said shell divider for positioning said primary inlet and said primary outlet on opposite sides of said divider; and said baffles extend outwardly from said divider into both said compartments for channeling said second fluid from said secondary inlet across said tubes and through said two compartments in turn for discharging a first portion of said second fluid from said first secondary outlet, and for discharging a remaining, second portion thereof from said second secondary outlet.

7. A heat exchanger according to claim 1 wherein said second circuit and said first and second secondary outlets are sized so that said second fluid first portion is removed from said second circuit at a greater flowrate than said second fluid second portion is removed from said second circuit, and the combined rate of removal of said second fluid from said second circuit equals the total rate of supply of said second fluid to said second circuit.

* * * * *